United States Patent [19]
Jost et al.

[11] 3,923,727
[45] Dec. 2, 1975

[54] PROCESS FOR DYEING THERMOPLASTICS IN THE MELT

[75] Inventors: Max Jost, Oberwil; Arnold Wick, Therwil, both of Switzerland

[73] Assignee: Ciba-Geigy Corporation, Ardsley, N.Y.

[22] Filed: Aug. 20, 1973

[21] Appl. No.: 389,909

[30] Foreign Application Priority Data
Aug. 29, 1972 Switzerland...................... 12753/72

[52] U.S. Cl. .......... 260/40 P; 260/37 P; 260/37 NP
[51] Int. Cl.². ............................................ C08K 5/08
[58] Field of Search......... 260/367, 368, 40 P, 37 P, 260/37 NP

[56] References Cited
UNITED STATES PATENTS

| | | | |
|---|---|---|---|
| 1,684,327 | 9/1928 | Mieg et al........................... | 260/367 |
| 2,076,197 | 4/1937 | Gutzwiller....................... | 260/367 X |
| 2,571,319 | 10/1951 | Waters et al...................... | 260/40 P |
| 2,585,682 | 2/1952 | Randall et al...................... | 260/367 |
| 2,908,684 | 10/1959 | Martin et al..................... | 260/368 X |
| 3,671,176 | 6/1972 | Kaufmann et al. ............. | 260/367 X |

*Primary Examiner*—M. J. Welsh
*Assistant Examiner*—S. M. Person
*Attorney, Agent, or Firm*—Vincent J. Cavalieri

[57] ABSTRACT

Process for dyeing thermoplastics in the melt, characterised by the use of a dyestuff of the formula

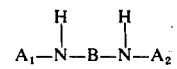

wherein $A_1$ and $A_2$ denote anthraquinonoid radicals and B denotes a carbocyclic or heterocyclic aromatic radical in which the imino groups are directly bonded to a benzene ring. Fast red to blue colorations are obtained.

10 Claims, No Drawings

PROCESS FOR DYEING THERMOPLASTICS IN THE MELT

It is known that the dyeing of linear polyesters in the melt makes very high demands of the heat resistance of the dyestuffs to be used, because of the high melting point of the polyesters. For example, when extruding films and filaments a mixture of polyester and dyestuffs is heated to a temperature above the melting point of the polyester, that is to say converted into a melt, and this molten state is maintained for at least 15 minutes and in many cases substantially longer.

In addition to possessing heat resistance, the dyestuffs usable for the bulk dyeing of polyesters must also have the necessary compatibility towards the polyester melt, which is heated to at least 275°C.

A further requirement of the dyestuffs is fastness to sublimation, that is to say the dyestuffs must neither sublime out of the molten polyester moulding composition nor out of the moulded end product.

Hitherto, only few dyestuff categories have been disclosed which are equal to these extreme requirements.

It has now been found that anthraquinone dyestuffs of the formula

(I)

wherein $A_1$ and $A_2$ denote anthraquinonoid radicals and B denotes a carbocyclic or heterocyclic aromatic radical in which the imino groups are directly bonded to a benzene ring, are outstandingly suitable for dyeing thermoplastics in the melt.

Dyestuffs of particular interest are those of the formula

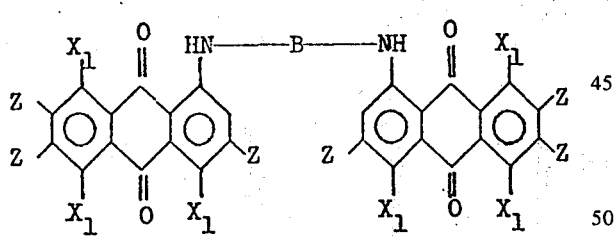

(II)

wherein B has the indicated meaning, one $X_1$ denotes an H atom or a hydroxyl, alkoxy, arylmercapto, arylamino, benzthiazolylmercapto or acylamino, especially benzoylamino, group and the remaining $X_1$ denote H atoms, one Z denotes an H atom or Cl atom and the other denote H atoms. The radicals $A_1$ and $A_2$ denote, for example, the radicals of 1-aminoanthraquinone, 1-amino-3-chloroanthraquinone, 1-amino-6- or 7-chloroanthraquinone, 1-amino-4-hydroxyanthraquinone, 1-amino-4-methoxyanthraquinone, 1-amino-5-methoxyanthraquinone, 1-amino-4-phenoxyanthraquinone, 1-amino-4-phenylmercaptoanthraquinone, 1-amino-5-phenylmercaptoanthraquinone, 1-amino-8-phenylmercaptoanthraquinone, 1-amino-4-phenylaminoanthra-quinone, 1-amino-4-benzoylaminoanthraquinone, 1-amino-4-(2',3'- or 4'-chlorobenzoylamino)-anthraquinone, 1-amino-5-benzoylaminoanthraquinone, 1-amino-5-(2',3'- or 4'-chlorobenzoylamino)-anthraquinone, 1-amino-8-benzoylaminoanthraquinone, 1-amino-4-benzthiazolylmercaptoanthraquinone and 1-amino-5-benzthiazolylmercaptoanthraquinone.

As further anthraquinonoid radicals there may be mentioned anthraquinone or anthrone radicals which contain a fused benzene ring or hetero-ring, such as, for example, the benzanthrone, pyrazolanthrone, isothiazolanthrone or anthrapyridone radicals. As examples, there may be mentioned the radicals of pyrazolanthrone, 5-aminoisothiazolanthrone, 6-amino-3-methylanthrapyridone, 3-aminobenzanthrone or 4-aminoanthraquinone-2,1(N),1',2'-(N)-benzacridone.

Possible aromatic radicals B are:

a. mononuclear or polynuclear aryl radicals, such as phenylene, naphthylene, anthracene or chrysene radicals.

b. Polyaryl radicals of the formula

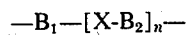

wherein $B_1$ and $B_2$ denote aryl radicals, for example naphthylene or especially phenylene radicals, n denotes the number 1–3 and X denotes a direct bond or a bridge, for example an O atom or S atom or an imino, —CO—, —COCO—, —SO$_2$—, -alkylene-, —N=N—, —NHCO— or —ORO— group, wherein R represents an alkylene or arylene group. X can also denote a heterocyclic radical, for example an oxdiazole or triazole radical.

c. Arylene radicals which contain a fused hetero-ring, for example a furane, thiophene, pyrrole, oxazole, thiazole, pyridine or pyrimidine ring or a cycloaliphatic 5-membered or 6-membered ring such as, for example, a fluorene or fluoroanthene radical.

As bridge members of the groups (a) there may preferably be mentioned those of the formula

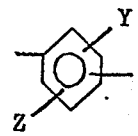

wherein Y denotes an H atom or a nitro group, an alkyl or alkoxy group containing 1–6 carbon atoms, an aralkoxy group, an arylsulphonyl or alkylsulphonyl group or a phthalimino group and Z denotes an H atom or an alkyl or alkoxy group, and especially those of the formula

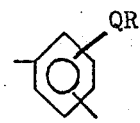

wherein Q denotes a —SO$_2$— or especially —CO— group and R denotes an alkyl radical containing 1–6 carbon atoms, or a phenyl, naphthyl or diphenyl radical.

As bridge members of the groups b) there may preferably be mentioned those of the formula

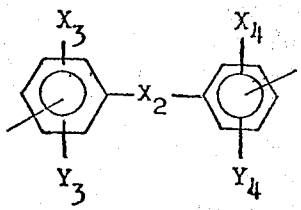

wherein $X_3$, $X_4$, $Y_3$ and $Y_4$ denote H or nitro groups, alkyl or alkoxy groups containing 1-6 carbon atoms or a phthalimino group and $X_2$ denotes a direct bond or a bridge, for example an O or S atom, an imino, keto, sulphone or alkylene group, preferably a methylene or ethylene group, or a group of the formula —CO—alkylene—CO—, As bridge members of group (c) there may preferably be mentioned those of the formula

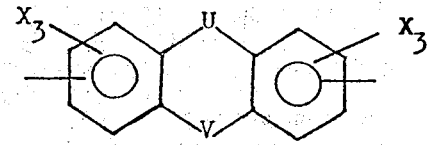

wherein $X_3$ has the indicated meaning, U denotes a direct bond or an O or S atom and V denotes an O or S atom or an imino, —CO—, —CH$_2$— or —SO$_2$— group, that is to say, for example, the radicals of fluorene, fluorenone, diphenyl oxide, diphenylsulphone, carbazole, thianthrene or xanthone.

The radicals B in the formula (II) preferably denote naphtylene, fluorene, 1,9-anthracene, perinaphthene,

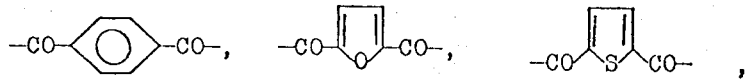

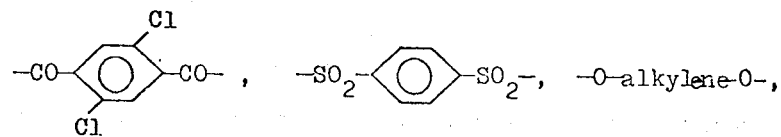

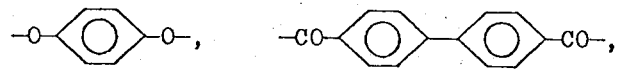

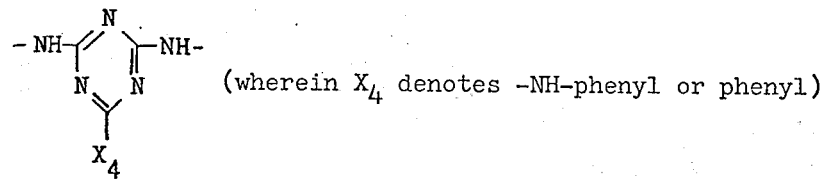  (wherein $X_4$ denotes -NH-phenyl or phenyl)

—NHCO—, —NHCO—alkylene—CONH—, —NHCOCONH—,

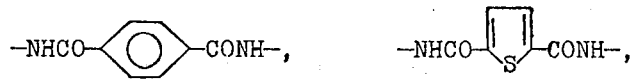

($X_3$ and $Z_3$ = H, halogen, alkyl or alkoxy)

—CONH— alkylene—NHCO—, 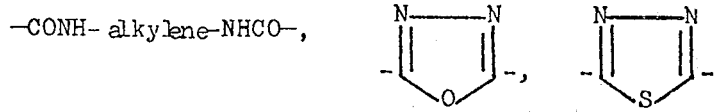

carbazole, N-alkylcarbazole, xanthene, thianthrene, diphenylene oxide, diphenylene sulphide or the radical of the formula

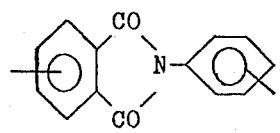

Dyestuffs of particular interest are those of the formula

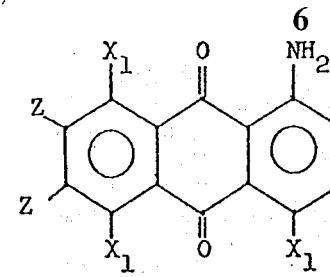

(VI)

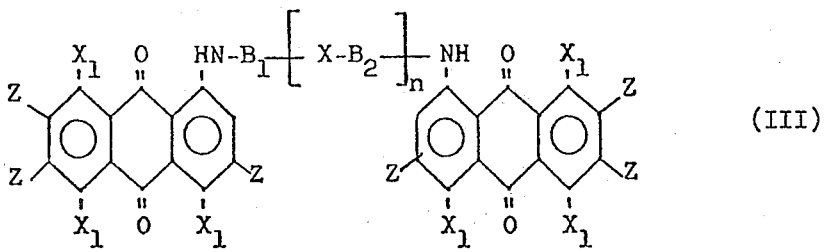

(III)

wherein $B_1$, $B_2$, X, $X_1$ and Z have the indicated meanings, as well as dyestuffs of the formula wherein $X_1$ and Z have the indicated meaning, in the molar ratio of 2:1, with a corresponding dihalogenoaryl

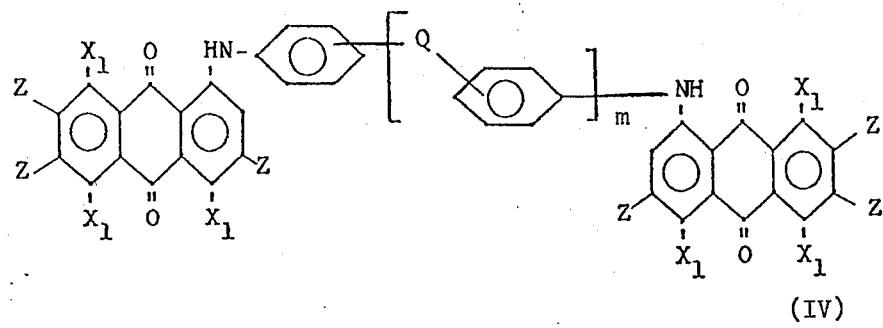

(IV)

wherein Q and $X_1$ and Z have the indicated meaning, and also those of the formula compound, especially a dihalogenoaryl compound of the formula

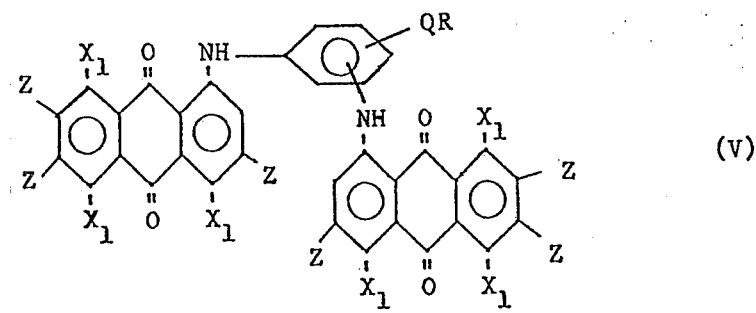

(V)

wherein Q, $X_1$ and Z have the indicated meaning.

The dyestuffs to be used according to the invention are in part known compounds and can be obtained according to known processes.

The dyestuffs containing a bridge member of group (a), that is to say a mononuclear or polynuclear aryl radical, are obtained, for example, by condensation of an aminoanthraquinone, especially an aminoanthraquinone of the formula

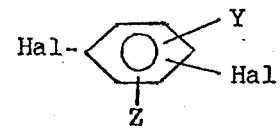

wherein Y and Z have the indicated meaning.

The following dihalogen compounds may be mentioned as examples: 1,4-dichlorobenzene, 2,4-dichloronitrobenzene, 1,4-dibromobenzene, 1,3- dibromobenzene, 2,4-dichlorotoluene, 2,6-dichloroanisole, 2,4-dichloroanisole, 2,4-dichloro-4-nitrodiphenyl ether, 2,4-dichloroacetophenone, 2,5-dichloroacetophenone, 2,4-dichloro-ω-phenylacetophenone, 2,5-dichloro-ω-phenylacetophenone, 1,4-dichloronaphthalene, 1,5-dichloronaphthalene, 1,5-dibromonaphthalene, 2,6-dibromonaphthalene, 9,10-dibromoanthracene, 2,8-dichlorochrysene, 2,8-dibromochrysene and 4,11-dibromofluoroanthene.

Dihalogen compounds of particular interest are those of the formula

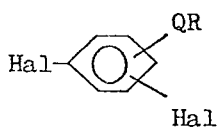

wherein Q and R have the indicated meaning, for example 2,4- or 2,5-dichlorobenzophenone, 4'-methyl-2,4-dichlorobenzophenone, 2',4'-dimethyl-2,4-dichlorobenzophenone, 4'-tert.-butyl-2,4-dichlorobenzophenone, 4'-phenyl-2,4-dichlorobenzophenone, 4'-α-naphthyl-2,4-dichlorobenzophenone, 2,4-dichlorodiphenylsulphone, 4'-methyl-2,4-dichlorodiphenylsulphone, 4'-tert.-butyl-2,4-dichloro-diphenylsulphone, 2',4'-dimethyl-2,4-dichloro-diphenylsulphone and 4'-phenyl-2,4-dichlorodiphenylsulphone.

The dyestuffs containing a bridge member of the group (b), that is to say a polyarylarylene radical, are appropriately obtained by condensation of an aminoanthraquinone, especially an aminoanthraquinone of the formula (VI), with dihalogenodiaryl compounds of the formula

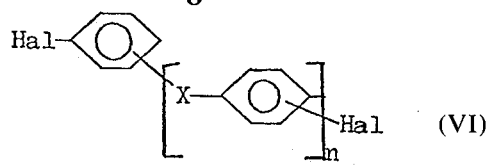 (VI)

wherein X, Hal and n have the indicated meaning.

The following dihalogenodiaryl compounds may be mentioned as examples: 4,4'-dichlorodiphenyl, 4,4'-dibromodiphenyl, 3,3'-dichlorodiphenyl, 4,4'-dichloro-3,3'-dimethyldiphenyl, 4,4'-dichlorodiphenylmethane, 4,4'-dibromodiphenylmethane, 4,4'-dichloro-1,2-diphenylethane, 4,4'-dichloro-1,1-diphenylethane, 4,4'-dichlorobenzil, 4,4'-dibromobenzil, 2,2'-dichlorobenzil, 3,3'- or 4,4'-dichloroazobenzene, 4,4'-dibromodiphenyl ether, 1,4-bis[4'-bromophenoxy]-benzene, 4,4'-dibromodiphenylamine, 4,4'-dichlorodiphenylsulphide, 3,3'-dichlorodiphenylsulphone, bis-(4-chlorophenyl)-sulphoxide, bis-(4-chloro-2-nitrophenyl)-sulphide, bis-(4-chlorophenyl)-terephthalic acid diamide, 2,4'-dichlorobenzophenone, 3,4'-dichlorobenzophenone, 3,3'-dibromobenzophenone, 4,4'-dichlorobenzophenone, 4,4'-dichloro-3-nitro-benzophenone, 1,4-bis[4'-bromobenzoyl]-benzene, 4,4'-bis[4''-chlorobenzoyl]-diphenyl, 1,5-bis[4'-chlorobenzoyl]-naphthalene, 2,5-bis[4'-chlorobenzoyl]-thiophene, 2,3'-dichlorodiphenylsulphone, 2,4'-dichlorodiphenylsulphone, 4,4'-dichlorodiphenylsulphone, 4,4'-dibromodiphenylsulphone, 1,2-bis-(4'-chlorobenzoyl)benzene, 1,3-bis-(4'-chlorobenzoyl)-benzene, 2,4-dichlorophenyl-α-naphthyl-sulphone, 2,5-dichlorophenyl-α-naphthyl-sulphone, 1,3-bis-(4'-chlorophenylsulphonyl)-benzene, 1,4-bis-(4'-chlorophenylsulphonyl)-benzene, 4,4'-bis-(4''-chlorophenylsulphonyl)-diphenyl as well as the compounds of the formulae

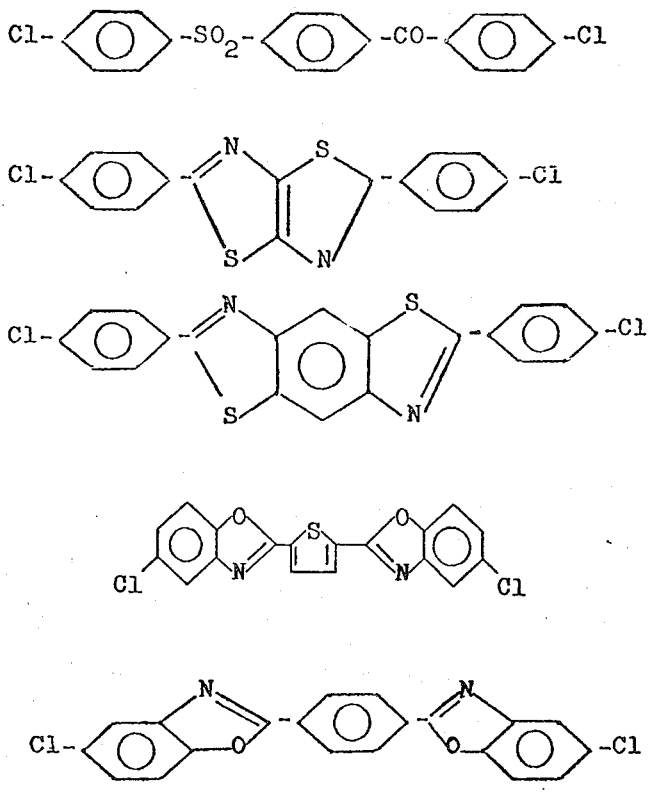

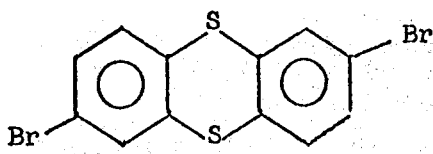

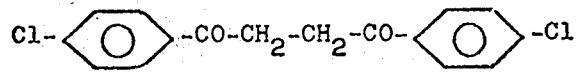

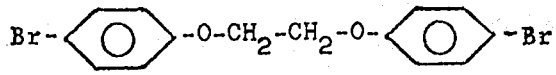

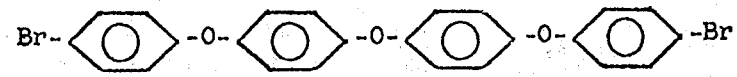

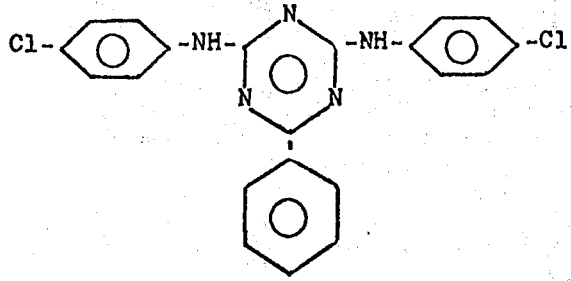

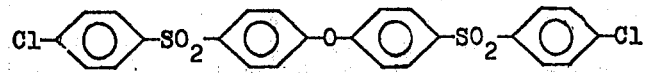

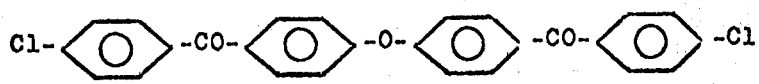

The dyestuffs containing a bridge member of the group (c) are obtained advantageously by condensation of an aminoanthraquinone, especially of an aminoanthraquinone of the formula (VI), in the molar ratio of 2:1 with a dihalogen compound of the formula

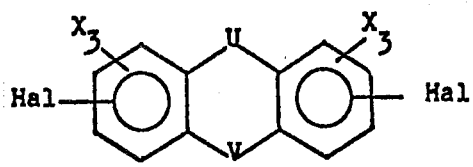

(VII)

wherein Hal, U, V and $X_3$ have the indicated meanings.

The following dihalogen compounds may be mentioned as examples: 2,7-dibromofluorene, 2,7-dichlorofluorenone, 2,7-dibromofluorenone, 2,8-dibromodiphenylene oxide, 2,8-dibromodiphenylenesulphide, 2,8-dibromodiphenylenesulphone, 2,7-dibromoxanthone, 3,6-dibromocarbazole and 3,6-dibromo-N-ethyl-carbazole.

The condensations mentioned are carried out according to customary processes by heating the components in an organic solvent, especially nitrobenzene, naphthalene or amyl alcohol, in the presence of acid-binding agents, such as alkali metal carbonates or alkali metal acetates, and catalysts, such as copper or copper compounds.

Thermoplastics which can be dyed with the dyestuffs mentioned are polystyrene and its copolymers, polycarbonates and polyamides, but especially linear polyesters.

As linear polyesters there may especially be mentioned those which are obtained by polycondensation of terephthalic acid or its esters with glycols of the formula HO—(CH$_2$)$_n$—OH, wherein n denotes the number 2–10, or with 1,4-di(hydroxymethyl)-cyclohexane, or by polycondensation of glycol ethers of hydroxybenzoic acids, for example p-(β-hydroxyethoxy)benzoic acid. The term linear polyesters also includes copolyesters which are obtained by partial replacement of the terephthalic acid by another dicarboxylic acid or a hydroxycarboxylic acid and/or by partial replacement of the glycol by another diol.

However, polyethylene terephthalates are of particular interest.

The linear polyesters to be dyed are appropriately intimately mixed, in the form of powders, chips or granules, with the dyestuff. This can be done, for example, by sprinkling the polyester particles with the finely divided dry dyestuff powder or by treating the polyester particles with a solution or suspension of the dyestuff in an organic solvent and subsequently removing the solvent.

Finally, the dyeing substance can also be added directly to the molten polyester or be added before or during the polycondensation of the polyethylene terephthalate.

The ratio of dyestuff to polyester can vary within wide limits depending on the desired colour strength. In general, it is advisable to use from 0.01 to 2 parts of dyestuff per 100 parts of polyester.

The polyester particles treated in this way are melted in an extruder according to known processes and extruded to give articles, especially films or fibres, or cast to give sheets.

Uniformly and intensely dyed articles of high fastness to light or to migration are obtained. The dyed fibres obtainable according to the process are furthermore distinguished by excellent fastness to wet processing and to dry cleaning.

A particular advantage of the dyestuffs to be used according to the invention is that they dissolve in the polyester melt and withstand high temperatures, up to 300°C, without decomposing, so that substantially clearer dyeings are obtained than when using insoluble pigments.

In the examples which follow the parts, unless otherwise stated, denote parts by weight and the percentages denote percentages by weight.

EXAMPLE 1

Non-delustered polyethylene terephthalate granules suitable for the manufacture of fibres are shaken with 1% of the dyestuff of the formula

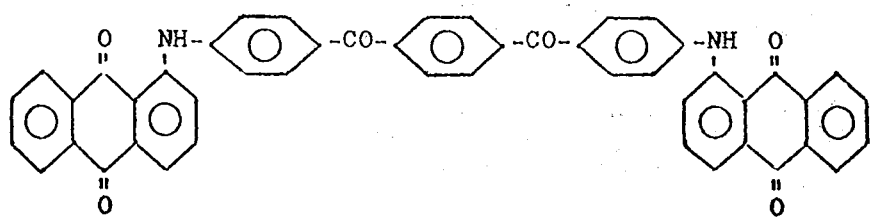

in a vessel which can be closed, on a shaking machine, for 15 minutes. The uniformly dyed granule particles are spun on a melt spinning installation (285°C ± 3°C, dwell time in the spinning machine approx. 5 minutes) to give filaments which are stretched, and wound up, on a stretch-and-twist installation. Because of the solubility of the dyestuff in polyethylene terephthalate, a vivid red dyeing is obtained, which is distinguished by outstanding fastness to light, excellent fastness to washing, dry cleaning, overdyeing and sublimation and high stability to chlorite bleach.

The dyestuff used in this example can be obtained as follows:

44.4 parts of 1,4-bis[4'-bromobenzoyl]-benzene, 47 parts of 1-aminoanthraquinone, 2 parts of copper-(I) chloride, 40 parts of sodium carbonate and 1,800 parts of nitrobenzene are stirred for 15 hours at the boil. The resulting precipitate is filtered off after cooling the mixture to 110°C, and is washed with nitrobenzene, alcohol and hot water and finally heated to the boil with dilute hydrochloric acid. After working up in the usual way, 67 parts of red-brown powder are obtained, which dissolves in concentrated sulphuric acid to give a brown colour and on dilution with water separates out again in red flocks.

EXAMPLES 2 – 11

The table which follows lists, in Column I, further dyestuffs which are used according to the process indicated in Example 1 for dyeing polyethylene terephthal-

| Example | Dyestuffs | Shade of the PES dyeing |
|---------|-----------|------------------------|
| 2 | | scarlet-red |

-Continued
| Example | Dyestuffs | Shade of the PES dyeing |
|---|---|---|
| 3 | 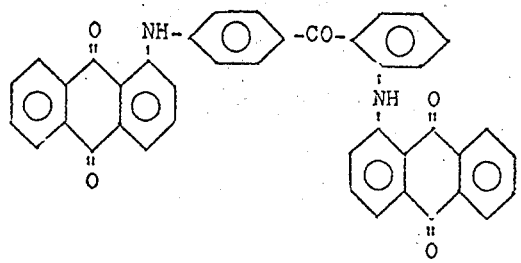 | red |
| 4 | 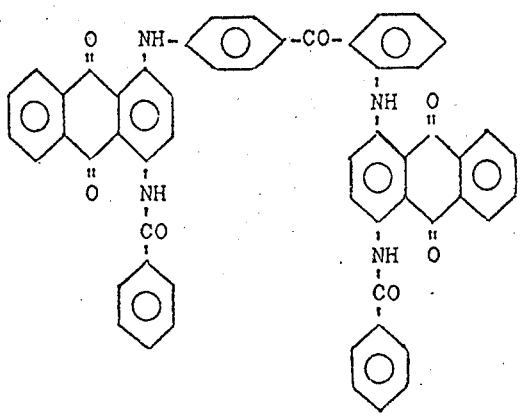 | violet |
| 5 | 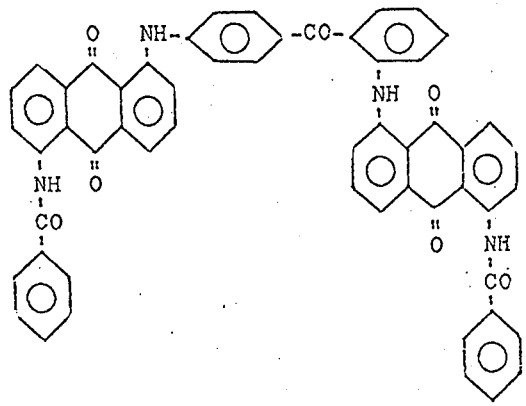 | dark red |
| 6 | 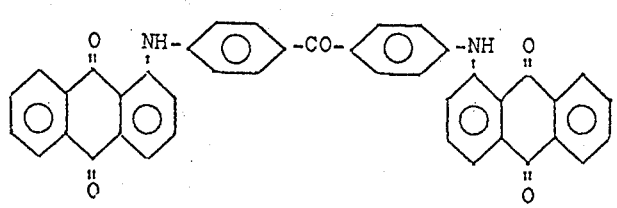 | red |

3,923,727
| Example | Dyestuffs | Shade of the PES dyeing |
|---|---|---|
| 7 | 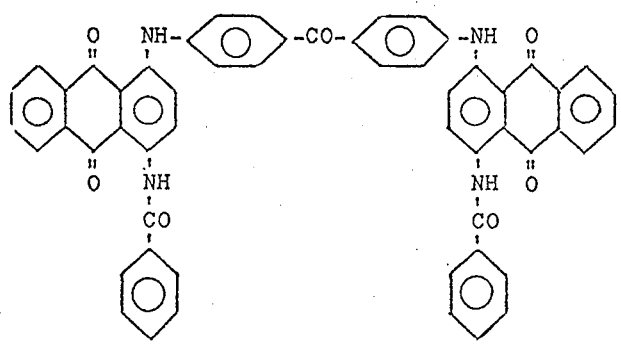 | blue |
| 8 | 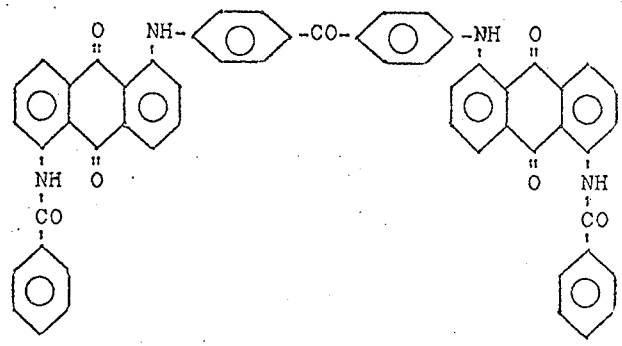 | dark red |
| 9 | 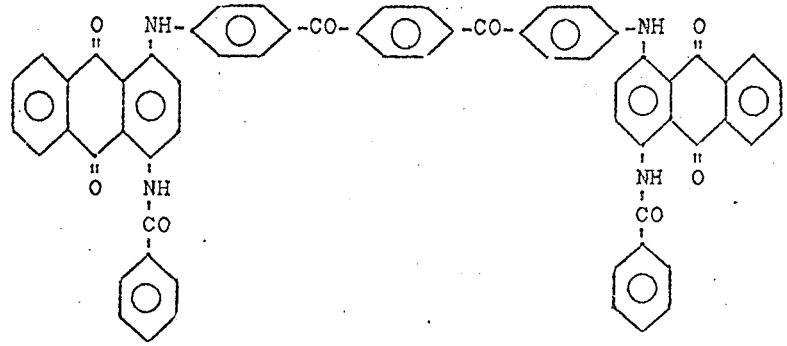 | blue |
| 10 | 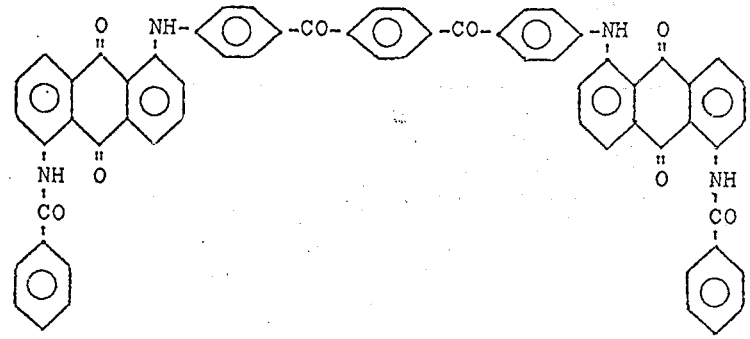 | dark red |

−Continued

| Example | Dyestuffs | Shade of the PES dyeing |
|---|---|---|
| 11 | 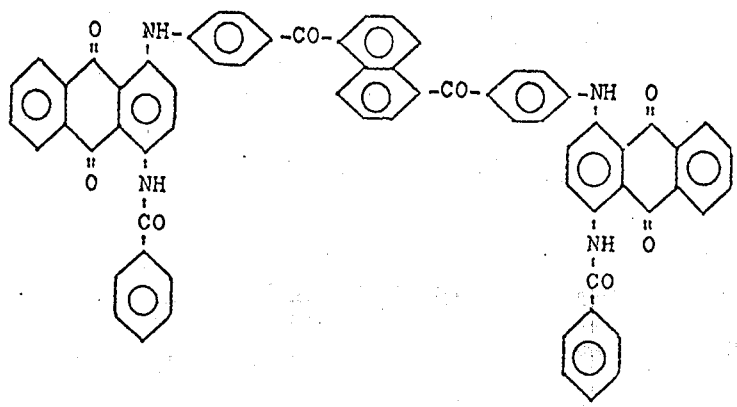 | blue | ate. Column II indicates the shade of the dyed fibre.
The dyestuffs used in these examples can be obtained according to the process indicated in Example 1 by condensation of 1 mol of the corresponding dihalogenoarylketone with 2 mols of the corresponding aminoanthraquinone.

| Example | Dyestuffs | Shade of the PES dyeing | Manufactured according to |
|---|---|---|---|
| 12 | | bluish-tinged red | DRP. 215,294 |
| 13 | | red | DRP 220,579 |
| 14 | | red | DRP 222,205 |
| 15 | | claret | DRP 230,400 |

-Continued

| Example | Dyestuffs | Shade of the PES dyeing | Manufactured according to |
|---|---|---|---|
| 16 | [anthraquinone-NH-C6H4-CH2-C6H4-NH-anthraquinone] | red | DRP 230,411 |
| 17 | [anthraquinone-NH-C6H4-C6H4-NH-anthraquinone] | violet-red | DRP 230,409 |
| 18 | [1,4-diaminoanthraquinone bridged via biphenyl, with NH-CO-C6H5 groups] | blue-green | DRP 230,409 |
| 19 | [1,4-diaminoanthraquinone bridged via biphenyl, with NH-CO-C6H5 groups] | violet | DRP 230,409 |
| 20 | [anthraquinone-NH-C6H4-O-C6H4-NH-anthraquinone] | red | DRP 248,655 |
| 21 | [anthraquinone-NH-C6H4-S-C6H4-NH-anthraquinone] | claret | DRP 248,655 |

—Continued
| Example | Dyestuffs | Shade of the PES dyeing | Manufactured according to |
|---|---|---|---|
| 22 | 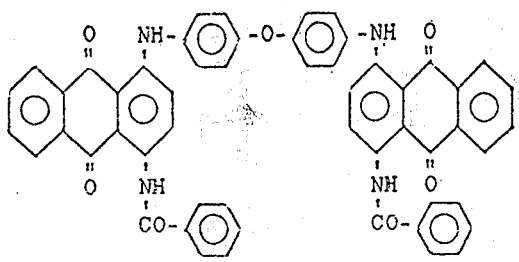 | blue | |
| 23 | 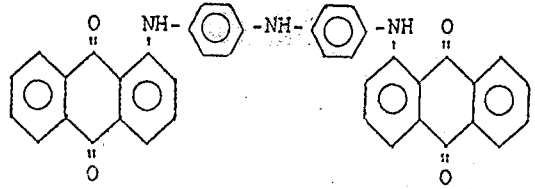 | red-violet | DRP 248,655 |
| 24 | 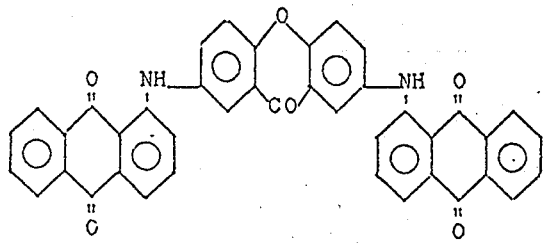 | claret | DRP 248,655 |
| 25 | 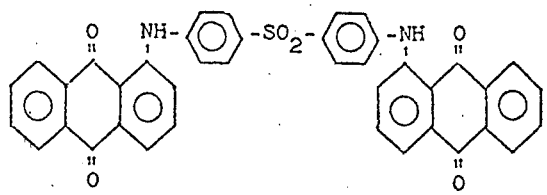 | red | DRP 234,518 |
| 26 | 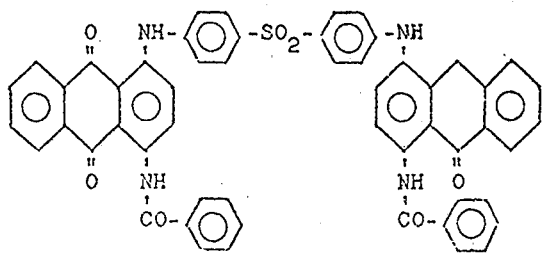 | blue-violet | |
| 27 | 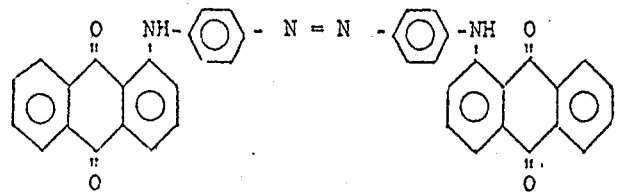 | red-brown | |

-Continued

| Example | Dyestuffs | Shade of the PES dyeing | Manufactured according to |
|---|---|---|---|
| 28 | bis-anthraquinone with –NH–⌬–NH–CO–CO–NH–⌬–NH– bridge | red | DRP 241,838 |
| 29 | bis(1-benzamido-4-amino-anthraquinone) linked via carbazole-2,7-diyl (NH) | blue | |
| 30 | bis(1-benzamido-4-amino-anthraquinone) linked via carbazole-3,6-diyl (NH) | brown-red | |
| 31 | bis(1-benzamido-4-amino-anthraquinone) linked via N-ethyl-carbazole-2,7-diyl | grey | |
| 32 | bis(1-benzamido-4-amino-anthraquinone) linked via N-ethyl-carbazole-3,6-diyl | brown | |

-Continued
| Example | Dyestuffs | Shade of the PES dyeing |
|---|---|---|
| 33 | 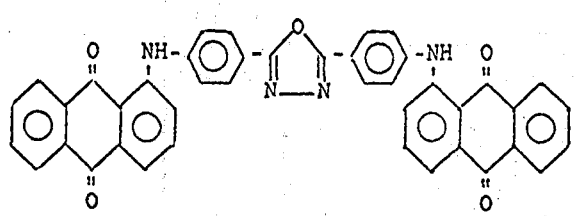 | dark red |
| 34 | 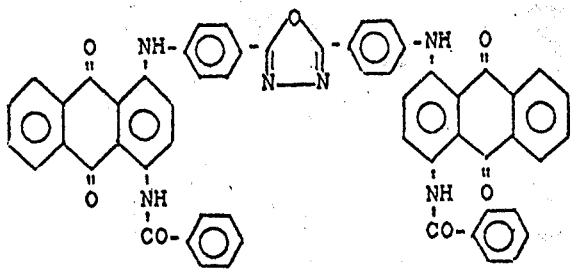 | grey-blue |
| 35 | 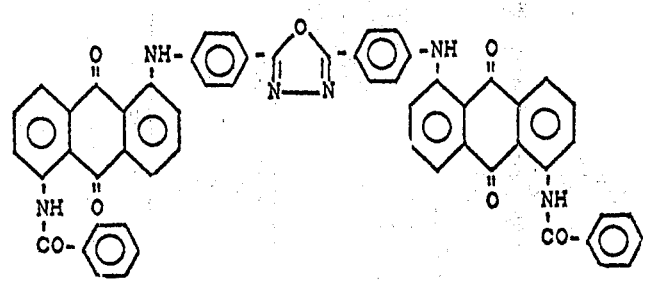 | claret |
| Example | Dyestuffs | Shade of the PES dyeing |
|---|---|---|
| 36 | 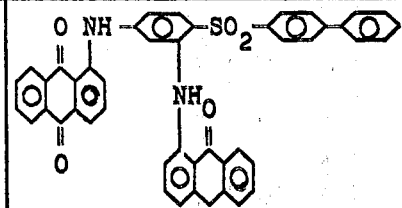 | red |
| 37 | 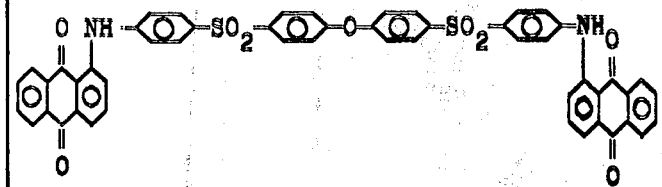 | orange |

-Continued

| Example | Dyestuffs | Shade of the PES dyeing |
|---|---|---|
| 38 | (anthraquinone)-NH-C₆H₄-SO₂-C₆H₄-SO₂-C₆H₄-NH-(anthraquinone) | orange |
| 39 | (anthraquinone)-NH-C₆H₃(-NH-anthraquinone)-SO₂-C₆H₄-CH₃ | orange |
| 40 | (anthraquinone)-NH-C₆H₄-SO₂-C₆H₄-C₆H₄-SO₂-C₆H₄-NH-(anthraquinone) | orange |
| 41 | (anthraquinone)-NH-C₆H₄-CO-C₆H₄-C₆H₄-CO-C₆H₄-NH-(anthraquinone) | red |
| 42 | (anthraquinone)-NH-C₆H₄-CO-C₆H₄-C₆H₄-CO-C₆H₄-NH-(anthraquinone) | red |
| 43 | (anthraquinone with NH-CO-C₆H₄ substituent)-NH-C₆H₄-CO-C₆H₄-C₆H₄-CO-C₆H₄-NH-(anthraquinone with NH-CO-C₆H₄ substituent) | blue |

—Continued

| Example | Dyestuffs | Shade of the PES dyeing |
|---|---|---|
| 44 | (structure: bis-anthraquinone with two NH linkages via -C₆H₄-CO-C₆H₄-CO-C₆H₄- bridge, with additional NH-CO-C₆H₄ substituents on each anthraquinone) | red |
| 45 | (structure: bis(anthraquinonylamino) compound bridged by -C₆H₄-CO-C₆H₄-CO-C₆H₄-) | red |
| 46 | (structure: bis(anthraquinonylamino) compound bridged by -C₆H₄-CO-C₆H₄(Cl)₂-CO-C₆H₄-) (reaction at 190°C) | red |
| 47 | (structure: anthraquinonylamino compound with -C₆H₄-CO- linkage and biphenyl, with NH-anthraquinone substituent) | red |
| 48 | (structure: anthraquinonylamino compound with -C₆H₄-CO- linkage to tetramethyl-substituted ring with CH, and NH-anthraquinone substituent) | red |

| Example | Dyestuffs | Shade of the PES dyeing |
|---|---|---|
| 49 | (structure) | dark olive |
| 50 | (structure) | brown |
| 51 | (structure) | yellow-brown |
| 52 | (structure) | brown |
| 53 | (structure) | brown-red |

-Continued

| Example | Dyestuffs | Shade of the PES dyeing |
|---|---|---|
| 54 | (structure) | red |
| 55 | (structure) | brown-red |
| 56 | (structure) | orange-red |
| 57 | (structure) | orange-red |
| 58 | (structure) | claret |

| Example | Dyestuffs | Shade of the PES dyeing |
|---|---|---|
| 59 | (anthraquinone-NH–C₆H₄–O–C₆H₄–N(CO)₂ phthalimide; with second anthraquinone-NH linkage) | red |
| 60 | (anthraquinone-NH–C₆H₄–O–C₆H₄–NO₂; with second anthraquinone-NH linkage) | red |
| 61 | bis(anthraquinonylamino)anthracene, with anilino substituents on each anthraquinone | blue |
| 62 | bis(anthraquinonylamino)anthracene, with Cl substituents on each anthraquinone (reaction at 170°C) | orange |
| 63 | 1,4-bis(anthraquinonylamino)anthracene | brown |
| 64 | 1,4-bis(anthraquinonylamino)naphthalene | claret |

| Example | Dyestuffs | Shade of the PES dyeing |
|---|---|---|
| 65 | (structure) | brown |
| 66 | (structure) | blue |
| 67 | (structure) | red |
| 68 | (structure) | red |
| 69 | (structure) | claret |
| 70 | (structure) | orange-brown |

-Continued

| Example | Dyestuffs | Shade of the PES dyeing |
|---|---|---|
| 71 | | violet |
| 72 | | olive |
| 73 | | claret |
| 74 | | claret |
| 75 | | brown |
| 76 | | brown |
| 77 | | olive |

-Continued

| Example | Dyestuffs | Shade of the PES dyeing |
|---|---|---|
| 78 | | claret |
| 79 | | red-brown |

| | | Shade in polyester |
|---|---|---|
| 80 | | claret |
| 81 | | claret |
| 82 | | claret |
| 83 | | green |

-Continued

| Example | Dyestuffs | Shade in polyester |
|---|---|---|
| 84 | (anthraquinone-NH–C₆H₄–CONH–C₆H₄–NH-anthraquinone) | claret |
| 85 | (bis-anthraquinone with NH-phenyl substituents, linked by –C₆H₄–CONH–C₆H₄–) | green |
| 86 | (anthraquinone-NH–C₆H₄–NHCO–C₆H₄–CONH–C₆H₄–NH-anthraquinone) | claret |
| 87 | (bis-anthraquinone with NH-phenyl substituents, linked by –C₆H₄–NHCO–C₆H₄–CONH–C₆H₄–) | green |
| 88 | (anthraquinone-NH–phthalimide–N–C₆H₄–NH–anthraquinone) | red |
| 89 | (anthraquinone-NH–benzofuran(Cl)–NH–anthraquinone) | claret |

| Example | Dyestuffs | Shade in polyester |
|---|---|---|
| 90 | [structure: bis-anthraquinone linked via chloro-dibenzofuran with NH bridges and NH-phenyl groups] | green |

EXAMPLES 91–102

| Example | Condensation product (manufactured according to the instructions in Example 1) from 1 mol of 2,8-dibromodiphenylene oxide and 2 mols of an amine: | Shade of the PES dyeing |
|---|---|---|
| 91 | 1-aminoanthraquinone | claret |
| 92 | 1-amino-3-chloroanthraquinone (reaction at 170°C) | red |
| 93 | 1-amino-4-benzoylaminoanthraquinone | blue |
| 94 | 1-amino-5-benzoylaminoanthraquinone | claret |
| 95 | 1-amino-4-methoxyanthraquinone (reaction at 175°C) | violet |
| 96 | 1-amino-4-anilinoanthraquinone | blue-green |
| 97 | 1-amino-5-phenoxyanthraquinone | claret |
| 98 | 1-amino-4-phenylmercaptoanthraquinone | violet |
| 99 | 1-amino-5-phenylmercaptoanthraquinone | red |
| 100 | 1-amino-4-benzthiazolylmercaptoanthraquinone | claret |
| 101 | 1-amino-5-benzthiazolylmercaptoanthraquinone | red |
| 102 | 5-amino-1,9-isothiazolanthrone | red |

EXAMPLES 103–114

| Example | Condensation product (manufactured according to the instructions in Example 1) from 1 mol of 4,4'-dibromobenzil and 2 mols of an amine: | Shade of the PES dyeing |
|---|---|---|
| 103 | 1-amino-3-chloroanthraquinone (reaction at 170°C) | orange |
| 104 | 1-amino-4-benzoylaminoanthraquinone | violet |
| 105 | 1-amino-4-methoxyanthraquinone (reaction at 175°C) | claret |
| 106 | 1-amino-5-methoxyanthraquinone (reaction at 175°C) | brown-orange |
| 107 | 1-amino-8-methoxyanthraquinone (reaction at 175°C) | orange |
| 108 | 1-amino-4-anilinoanthraquinone | green |
| 109 | 1-amino-5-phenoxyanthraquinone | orange |
| 110 | 1-amino-4-phenylmercaptoanthraquinone | claret |
| 111 | 1-amino-5-phenylmercaptoanthraquinone | orange |
| 112 | 1-amino-4-benzthiazolylmercaptoanthraquinone | claret |
| 113 | 1-amino-5-benzthiazolylmercaptoanthraquinone | orange |
| 114 | 5-amino-1,9-isothiazolanthrone | orange |

EXAMPLES 115–123

| Example | Condensation product (manufactured according to the instructions in Example 1) from 1 mol of 4,4'-dichlorodiphenylsulphone and 2 mols of an amine: | Shade of the PES dyeing |
|---|---|---|
| 115 | 1-amino-4-benzoylaminoanthraquinone | violet |
| 116 | 1-amino-5-benzoylaminoanthraquinone | red |
| 117 | 1-amino-4-anilinoanthraquinone | blue |
| 118 | 1-amino-5-phenoxyanthraquinone | orange |
| 119 | 1-amino-4-phenylmercaptoanthraquinone | claret |
| 120 | 1-amino-5-phenylmercaptoanthraquinone | orange |
| 121 | 1-amino-4-benzthiazolymercaptoanthraquinone | claret |
| 122 | 1-amino-5-benzthiazolmercaptoanthraquinone | orange |
| 123 | 5-amino-1,9-isothiazolanthrone | orange |

EXAMPLES 124–129

| Example | Condensation products (manufactured according to the instructions of Example 1) from 1 mol of 4,4'-dibromodiphenyl ether and 2 mols of one of the following aminoanthraquinones: | Shade in polyester |
|---|---|---|
| 124 | 1-amino-4-anilinoanthraquinone | green |
| 125 | 1-amino-5-benzoylaminoanthraquinone | claret |
| 126 | 1-amino-8-benzoylaminoanthraquinone | claret |
| 127 | 1-amino-4-methoxyanthraquinone | violet |
| 128 | 1-amino-4-phenylmercaptoanthraquinone | violet |
| 129 | 1-amino-5-phenylmercaptoanthraquinone | claret |

EXAMPLES 130–135

| Example | Condensation products (manufactured according to the instructions of Example 1) from 1 mol of 1,1-di-(4-chlorophenyl)-ethane and 2 mols of one of the following aminoanthraquinones: | Shade in polyester |
|---|---|---|
| 130 | 1-aminoanthraquinone | claret |
| 131 | 1-amino-4-benzoylaminoanthraquinone | blue |
| 132 | 1-amino-5-benzoylaminoanthraquinone | claret |
| 133 | 1-amino-4-anilinoanthraquinone | green |
| 134 | 1-amino-4-phenylmercaptoanthraquinone | violet |
| 135 | 1-amino-5-phenylmercaptoanthraquinone | claret |

EXAMPLE 136

1,000 parts of polyethylene terephthalate granules, 10 parts of titanium dioxide and 1 part of the compound of the formula

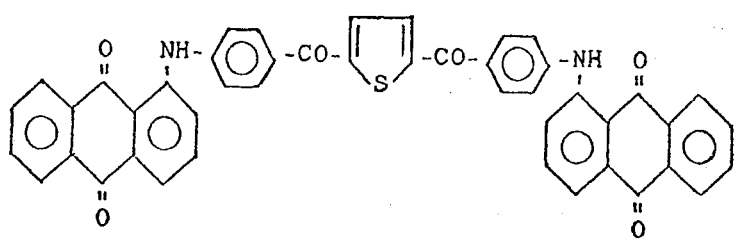

are mixed in a closed vessel for two hours on a roller stand. The coloured granules are extruded at approx. 260°C as 2 mm diameter strands and are again granulated. The resulting granules are injection-moulded in an Anker screw injection moulding machine at 270°–280°C to give mouldings. A moulding coloured matt red, with very good fastness to light, is obtained.

The dyestuff used in paragraph 1 can be obtained according to the process indicated in Example 1, by condensation of 1 mol of 2,5-di-(p-bromobenzoyl)-thiophene with 2 mols of 1-aminoanthraquinone.

EXAMPLE 137

A mixture of 12.6 parts of 1-amino-4-anilinoanthraquinone, 13.7 parts of 1-amino-4-benzoylaminoanthraquinone, 13.2 parts of 4,4'-dibromodiphenyl ether, 10 parts of sodium carbonate, 0.4 part of copper powder and 0.4 part of copper-I chloride in 150 parts of nitrobenzene is stirred for 5 hours at 200°–210°C whilst distilling off the water formed in the reaction. After cooling the reaction mixture to 60°C, 50 parts of alcohol are added and the mixture was only worked up further according to Example 1 after it had cooled to room temperature. A blue condensation mixture which produces bulk colouration of polyester in dark blue shades is obtained.

EXAMPLE 138

A mixture of 17.2 parts of 4,4'-dichlorodiphenylsulphone, 13.5 parts of 1-aminoanthraquinone, 18.9 parts of 1-amino-4-anilinoanthraquinone, 12 parts of sodium carbonate, 1.2 parts of copper-(I) chloride and 250 parts of nitrobenzene is heated to the boil for 15 hours, whilst stirring. The reaction product is obtained in very good yield by distilling off the nitrobenzene by means of steam, filtering off the precipitate, washing it with water and subsequently drying it. The resulting product dyes polyethylene terephthalate in grey to black shades.

EXAMPLES 139–146
Examples of uses in polyamide:

99 parts of polyamide 66 in the form of chips are sprinkled dry with one part of the finely divided dyestuff according to Example 20. The sprinkled chips are spun in the usual manner, for example using the grid spinning process at about 290°–95°C. Light-fast, claret-coloured fibres are obtained. The following dyestuffs are similarly suitable for the bulk-dyeing of polyamide:

| Example | Dyestuff | Shade in polyamide |
|---|---|---|
| 140 | Dyestuff according to Example 80 | claret |
| 141 | Dyestuff according to Example 130 | claret |
| 142 | Dyestuff according to Example 124 | dark green |
| 143 | Dyestuff according to Example 85 | olive-green |
| 144 | Dyestuff according to Example 87 | olive-green |
| 145 | Dyestuff according to Example 136 | red-brown |
| 146 | 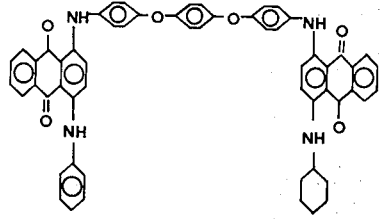 | dark green |

EXAMPLES 147–164

A mixture of 24 parts of 1-amino-4-hydroxyanthraquinone, 16.5 parts of 4,4'-dibromodiphenyl ether, 10 parts of anhydrous sodium acetate, 0.5 part of copper powder and 0.5 part of copper-I chloride in 250 parts of nitrobenzene is stirred for 50 hours at 200°–210°C whilst distilling off acetic acid. After further working up of the reaction mixture according to the instructions in Example 1, 26 parts of the dyestuff of the formula

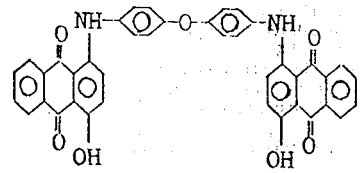

are obtained, which bulk-dyes polyesters in strongly coloured brilliant reddish-tinged blue shades having good fastness properties.

The product can be obtained in an analytically pure, crystalline form by recrystallisation from nitrobenzene.

| $C_{40}H_{24}N_2O_7$ | Calculated. | C 74.52 | H 3.75 | N 4.35 |
|---|---|---|---|---|
|  | Found. | C 74.0 | H 3.9 | N 4.7 |

Similar dyestuffs are obtained if instead of 4,4'-dibromodiphenyl ether equivalent amounts of the following dibromo compounds are condensed analogously.

| Example | Dibromo compound | Shade in polyester |
|---|---|---|
| 148 | 4,4''-dibromohydroquinonediphenyl ether | reddish-tinged blue |
| 149 | 2,8-dibromodiphenylene oxide | reddish-tinged blue |
| 150 | 1,4-dibromobenzene | blue |
| 151 | 1,3-dibromobenzene | reddish-tinged blue |
| 152 | 4,4'-dibromodiphenyl | blue |
| 153 | 4,4''-dibromo-p-terphenyl | blue |
| 154 | 3,3'-dibromobenzophenone | violet |
| 155 | 4,4''-dibromobenzil | violet |
| 156 | 4,4'-dibromodiphenylsulphone | violet |
| 157 | 4,4'-dibromodiphenylmethane | blue |
| 158 | 2,7-dibromoxanthone | violet |
| 159 | 3,6-dibromocarbazole | blue |
| 160 | 3,6-dibromo-N-ethylcarbazole | blue |
| 161 | 2,7-dibromofluorene | blue |
| 162 | 2,7-dibromofluorenone | blue |
| 163 | dibromothianthrene, isomer mixture | blue |
| 164 | 4,11-dibromofluoranthene | grey-blue |

EXAMPLE 165

0.05 part of iodine is added to a solution of 17 parts of diphenyl ether in 450 parts of nitrobenzene and a solution of 32.3 parts of bromine in 50 parts of nitrobenzene is then added dropwise over the course of 1 hour. The mixture is stirred for 1 hour at room temperature and thereafter for a further hour at 50°–55°C. 37 parts of anhydrous sodium acetate, 48 parts of 1-amino-4-hydroxyanthraquinone, 0.5 part of copper powder and 0.5 part of copper-I chloride are now added and the mixture is then stirred for 50 hours at 200°–210°C whilst distilling off acetic acid. After working up according to Example 1, 54 parts of a blue dyestuff are obtained, which largely corresponds to that of Example 147 and bulk-dyes polyesters in reddish-tinged blue fast shades.

In the same way, valuable dyestuff mixtures can be manufactured if instead of diphenyl ether equivalent amounts of the following aryl compounds are brominated and thereafter condensed with 1-amino-4-hydroxyanthraquinone in the above manner:

| Example | Aryl compound | Shade in polyesters |
|---|---|---|
| 166 | Naphthalene | blue |
| 167 | Diphenyl | blue |
| 168 | p-Terphenyl | blue |
| 169 | Carbazole | blue |
| 170 | N-Ethylcarbazole | blue |
| 171 | Diphenylene oxide | blue |
| 172 | Fluorene | blue |
| 173 | Thianthrene | blue |
| 174 | Fluoranthene | grey-blue |

What we claim is:

1. A process for dyeing a thermoplastic in the melt characterised by the use of a dyestuff of the formula

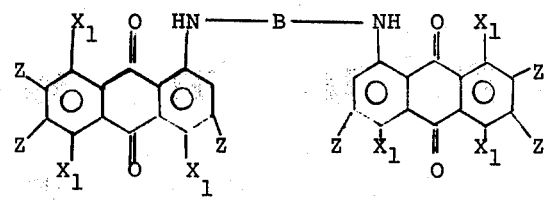

wherein B is a carbocyclic or heterocyclic aromatic radical in which the imino groups are directed bonded to a benzene ring, one $X_1$ denotes H hydroxyl, alkoxy, arylmercapto, arylamino, benzthiazolylmercapto or acylamino and the other $X_1$ denotes H, one Z denotes H or chlorine and the other Z denotes H.

2. Process according to claim 1, characterised in that a dyestuff of the formula

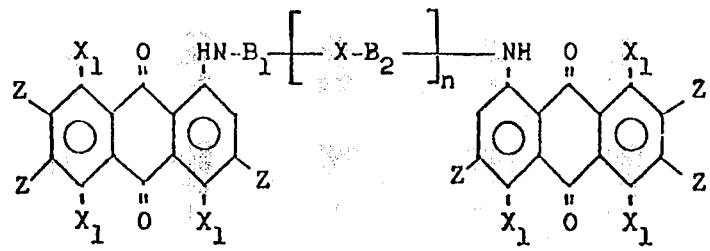

is used, wherein $X_1$ and Z have the indicated meaning, $B_1$ and $B_2$ denote arylene radicals, and X denotes a direct bond, an O or S atom, a —CO—, —SO$_2$—, alkylene, imino, azo, —COCO—, —NHCO— or —NHCOCONH— group or an oxdiazole radical or a —O—R—O— group, wherein R is an alkylene or arylene group and $n$ denotes the number 1, 2 or 3.

3. Process according to claim 1, characterised in that a dyestuff of the formula

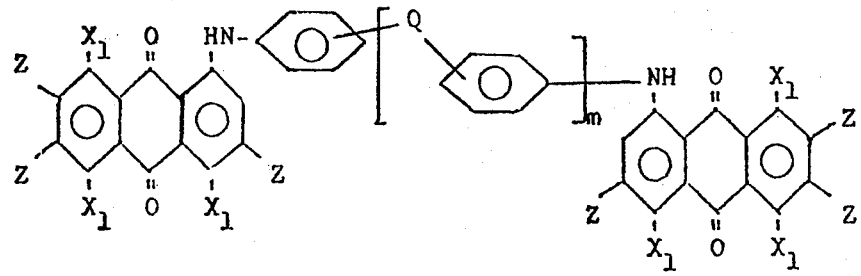

is used, wherein $X_1$ and Z have the indicated meaning, Q denotes a —SO$_2$— group or especially a —CO— group and $m$ denotes the number 1 or 2.

4. Process according to claim 1, characterised in that a dyestuff of the formula

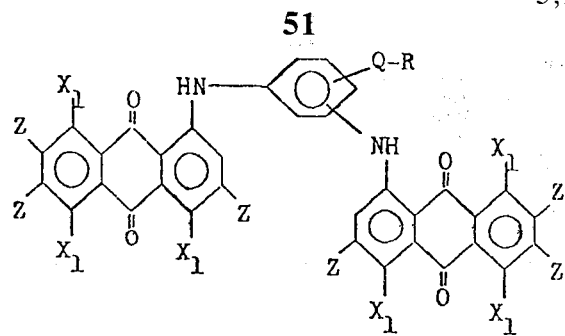

is used, wherein $X_1$ and Z have the indicated meaning, Q denotes a —CO— or —SO$_2$— group and R denotes an alkyl radical containing 1–6 C atoms or a phenyl, naphthyl or diphenylyl radical.

5. Process according to claim 1, characterised in that the dyestuff of the formula

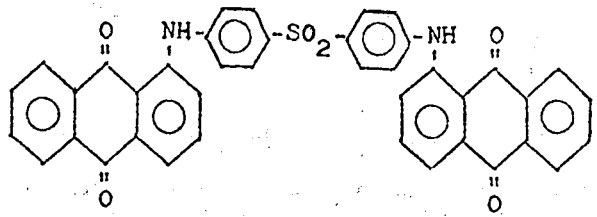

is used.

6. Process according to claim 1, characterised in that the dyestuff of the formula

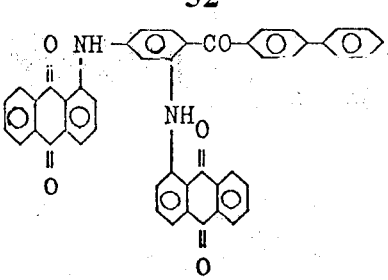

is used.

7. Process according to claim 1, characterised in that the dyestuff of the formula

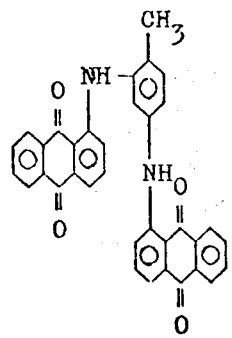

is used.

8. Process according to claim 1, characterised in that a linear polyester is used as the thermoplastic.

9. The dyed polyester consisting essentially of the product obtained according to the process of claim 8.

10. The dyed thermoplastic consisting essentially of the product obtained according to the process of claim 1.

* * * * *